(12) United States Patent
Auer

(10) Patent No.: US 7,576,442 B2
(45) Date of Patent: Aug. 18, 2009

(54) MOBILE POWER PLANT

(76) Inventor: Gerhard Auer, Pluddemanngasse 77/1, Graz (AT) A-8010

(*) Notice: Subject to any disclaimer, the term of this patent is extended or adjusted under 35 U.S.C. 154(b) by 480 days.

(21) Appl. No.: 10/599,104

(22) PCT Filed: Mar. 25, 2005

(86) PCT No.: PCT/AT2005/000109

§ 371 (c)(1), (2), (4) Date: Sep. 19, 2006

(87) PCT Pub. No.: WO2005/093236

PCT Pub. Date: Oct. 6, 2005

(65) Prior Publication Data

US 2008/0284177 A1  Nov. 20, 2008

(30) Foreign Application Priority Data

Mar. 29, 2004  (AT) ............................. A 554/2004

(51) Int. Cl.
*H02P 9/04* (2006.01)
*G05B 13/00* (2006.01)

(52) U.S. Cl. ............................. 290/1 A; 290/2; 700/276
(58) Field of Classification Search .................. 290/1 A, 290/2, 40 R, 40 B, 51; 700/276, 291
See application file for complete search history.

(56) References Cited

U.S. PATENT DOCUMENTS

| | | | |
|---|---|---|---|
| 4,226,214 A | 10/1980 | Palazzetti et al. | |
| 4,992,669 A | 2/1991 | Parmley et al. | |
| 5,497,615 A | 3/1996 | Noe et al. | |
| 5,584,185 A * | 12/1996 | Rumble et al. | 62/115 |
| 6,067,945 A * | 5/2000 | Fukuda et al. | 123/2 |
| 7,040,544 B2 * | 5/2006 | Guyer | 237/12.1 |
| 7,239,034 B2 * | 7/2007 | Gehret, Jr. | 290/40 B |
| 7,284,709 B2 * | 10/2007 | Guyer | 237/12.1 |
| 7,343,226 B2 * | 3/2008 | Ehlers et al. | 700/276 |

FOREIGN PATENT DOCUMENTS

| | | |
|---|---|---|
| DE | 3528148 A1 | 2/1987 |
| DE | 19944237 A1 | 3/2001 |
| GB | 1507908 A | 4/1978 |

* cited by examiner

*Primary Examiner*—Nicholas Ponomarenko
(74) *Attorney, Agent, or Firm*—David A. Guerra

(57) ABSTRACT

The invention relates to a mobile container power plant. The aim of the invention is to allow for the first time the production of a mobile power plant of this size, which produces an electric current without the emission of pollutants. To achieve this, said plant consists of a container (1), in which a drive assembly (4), a generator (3), a drive shaft with transmission gearing (5), a ventilation and deaeration system (9) and a control system (7) comprising GPS-GSM technology are installed. The mobile power plant can supply an electric current of up to 10 MW. Said electric current is environmentally friendly, as the fuel that is used consists of methanol and water or ethanol and water and produces no pollutants. Said mobile container can be installed anywhere and is autonomous as it contains a tank (10) with a capacity of up to 45,000 liters.

18 Claims, 2 Drawing Sheets

MOBILE POWER PLANT

CROSS-REFERENCE TO RELATED APPLICATIONS

Figure 1:
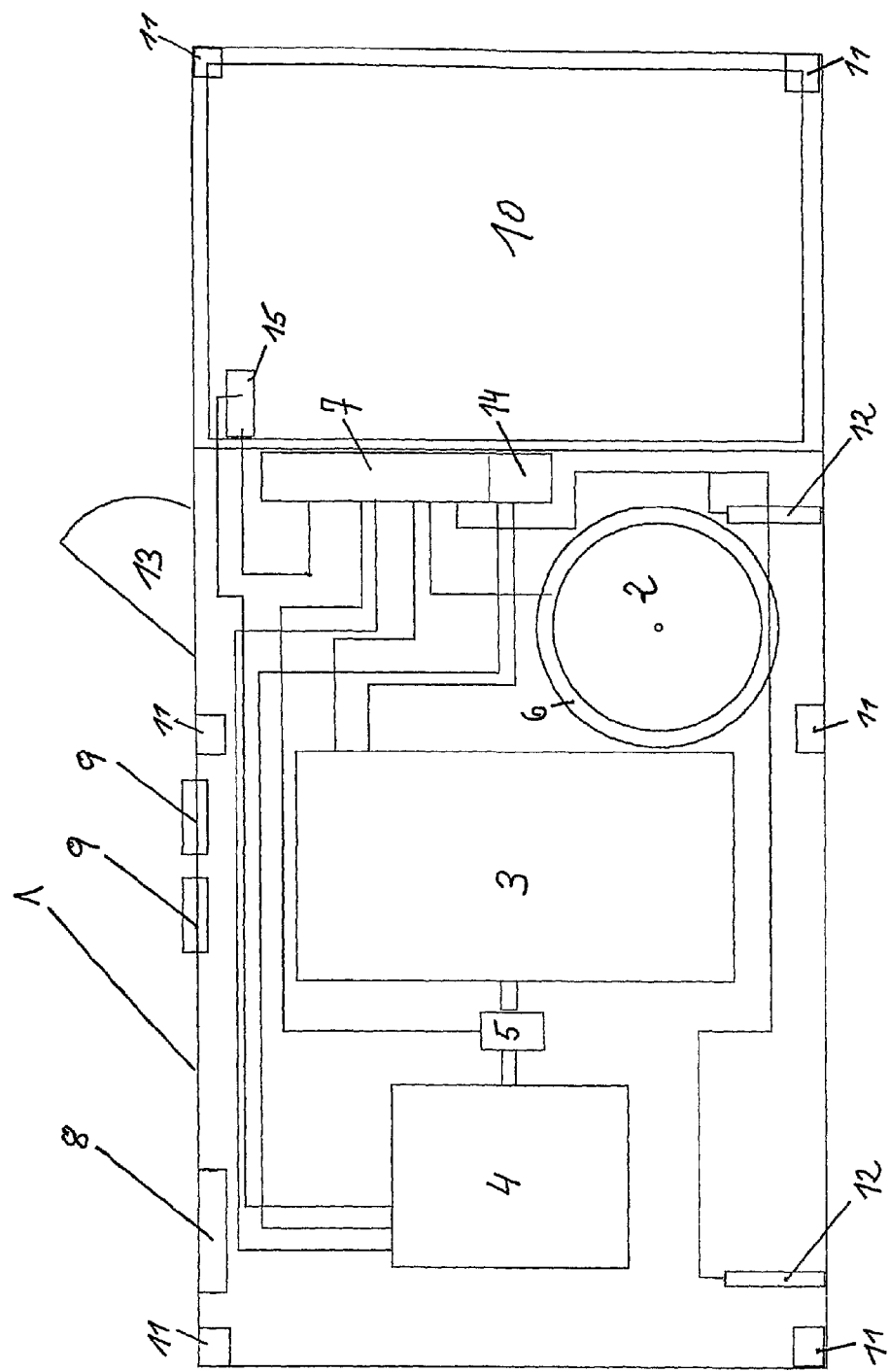
Figure 2:
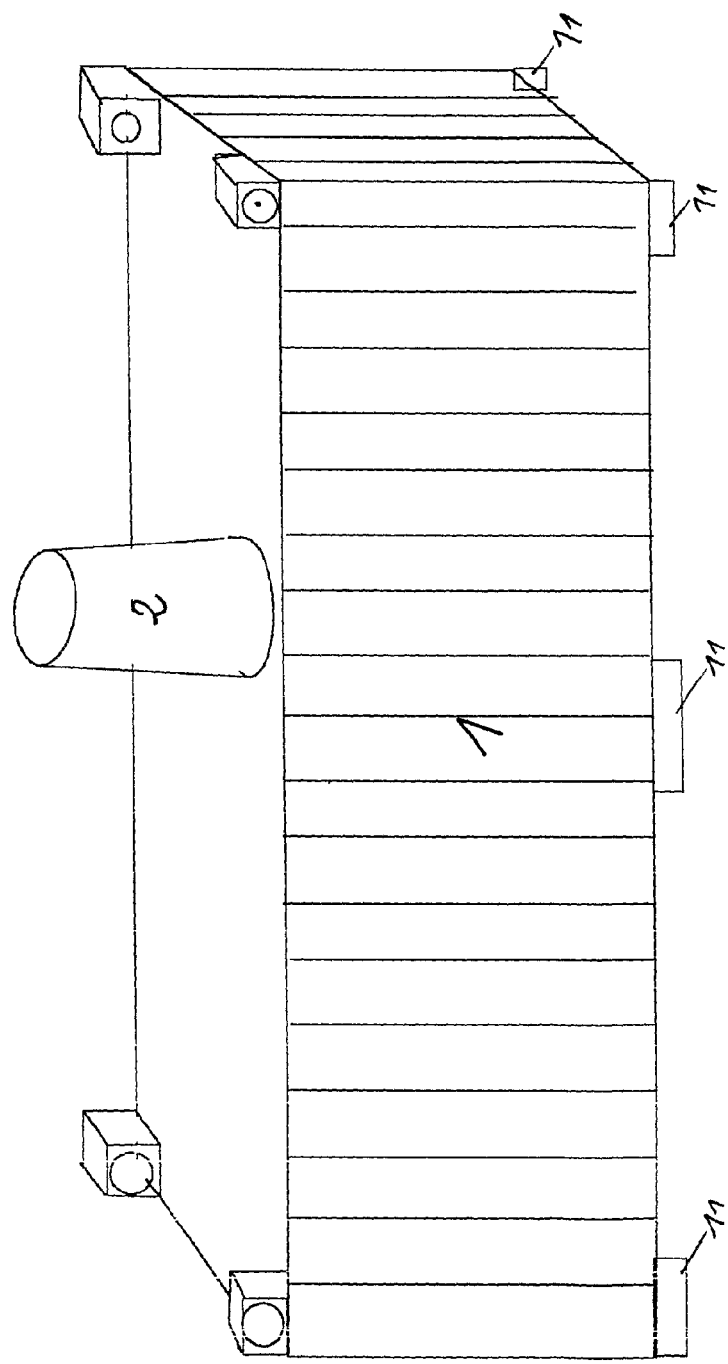

This application is an U.S. national phase application under 35 U.S.C. §371 based upon co-pending International Application No. PCT/AT2005/000109 filed on Mar. 25, 2005. Additionally, this U.S. national phase application claims the benefit of priority of co-pending International Application No. PCT/AT2005/000109 filed on Mar. 25, 2005 and Austria Application No. A 554/2004 filed on Mar. 29, 2004. The entire disclosures of the prior applications are incorporated herein by reference. The international application was published on Oct. 6, 2005 under Publication No. WO 2005/093236.

The object of the invention is to produce an operating plant which is able to generate electricity, to operate free of harmful emissions and nevertheless be capable of being set up anywhere.

In order to meet this object in an inventive manner there is required a container (I), a drive unit (4), a generator (3), an exhaust pipe (2), an exhaust heat exchanger (6), a drive shaft with transmission (5), an aerating and de-aerating installation (9), a control system (7) with GPS-GSM monitoring system and a tank (10) integrated in the container, a door (13) and a hydraulic plant (12) for opening the front side. This invention has the object of producing electricity without harmful emissions and to be mobile. In order to meet this requirement, there is needed an installation system comprising a container (1) having a length of 2 m up to 12 m and a width of 1 m up to 3 m and a height of 1 m up to 3 m. The framework of this container (I), depending on size, consists of steel, aluminum or light metal, at the bottom panel at each corner special rubber buffers (11) being fitted in order to absorb any vibrations. The walls of this container (1) comprise a sandwich panel system composed of aluminum or steel sheet, the foam filling amounts to 5 cm-15 cm of an insulation material which has the object of insulating against noise and heat. Due to this inventively solved effort it is possible to place and set up this plant anywhere. The special injection system which is to be used permits the employment of all conventional combustion engines. Due to the use of fuel—water mixtures such as methanol—water or the employment of natural gas it is possible to speak of a power plant which produces zero pollutants. The drive unit (4) which may have an output of 100 HP up to 20.000 HP permits it to use generators (3) with an output of 0.2 MW up to 7 MW. Using the new generation of generators it is even possible to attain outputs up to 10 MW. The control system (7) with built-in GPS-GSM monitors the plant and controls and optimises its power demand depending on requirements. This task is performed by the control system (7) which is connected to the drive aggregate (4), the generator (3) and the tariff regulators (14). The object of this control system (7) is accordingly to monitor and to control the entire plant, to switch off the drive unit or set it going again depending on requirements, optimising the rate of rotation and to take care that the generator produces the demanded amount of electricity. The means integrated into the control system (7) such as the tariff regulator (14) which is responsible for the optimised electricity supply factor together with the GPS-GSM monitoring system have the object to immediately transmit mal-performance reports and when required, maintenance can be performed by remote means. This control system (7) also permits communicating and operating with more than one plant. Due to this inventive innovation one is able to provide a ring circuit, this in turn would mean that, by means of this invention of a mobile power plant an installation system has been created which can supply whole cities with electricity without the need of establishing expensive installations or constructing these, and in addition it is to be remembered that this invention generates power without the emission of pollutants and this installation system can be set up where ever it is required, Such as protective security housing complexes, hospitals, social establishments, factories in social regions where power supply is not possible. This invention also offers the advantage that large cities can be equipped with a ring circuit system, controlled by the control system (7) and the tariff regulator (14). This invention also only makes it possible that in future no power failures can arise because the plant is self-controlling and because this is prevented by the tariff regulator (14). For cities having such a ring circuit system this would mean that their own power supply is secured by buried cables, no feed power system is required anymore and no dependency on third parties. For the required energy in order to be able to operate this plant, a tank system (10) is installed in this container (1). This integrated tank (IO) has the advantage of independence, it is no longer necessary to set up a separate tank, no feed lines are required which need to meet local regulations and accordingly this mobile power plant can be operated at any time and any place without diverse regulations having to be met. The high energy output and the fact that the mobile power plant produces electricity without pollution makes this invention what it is, that is to say, unique.

The exhaust heat generated by the operation of the drive unit (4) is discharged through the exhaust pipe (2). The exhaust gas heat exchanger (6) installed in the exhaust pipe (2) permits to so utilise the waste heat that this can be employed for hot water preparation as well as for the new process of refrigeration. This once again means a 100% utilisation of the energy input.

1 Container/Module
2 Exhaust Pipe
3 Generator
4 Drive Unit
5 Drive Shaft with Transmission
6 Exhaust Gas Heat Exchanger
7 Control System with GPS-GSM
8 Air Filter Plant for Aggregate
9 Aeration and Venting
10 Tank
11 Rubber Buffers
12 Hydraulic Plant
13 Door
14 Tariff Regulator
15 Fuel Pump
16 Fuel Control System

The invention claimed is:

1. A mobile operating plant which permits generating electricity without the emission of pollutant, the mobile operating plant comprising:
   a container having sheet panels which are filled with an insulating material against heat and noise, and a frame being fitted at the bottom in each case at the corners with buffers in order to absorb any vibrations;
   a drive unit located in the container, the drive unit being a combustion engine of conventional construction;
   an electricity generator driven by the drive unit by means of a drive shaft by way of a transmission;
   a fuel tank for supplying fuel to the drive unit;
   a control system being adapted to control the drive unit runs at an optimal rate of rotation and when required switches the drive unit on or off so that the generator delivers power requirements as demanded which in turn are optimized by means of a tariff regulator; and an exhaust gas heat exchanger installed in an exhaust pipe is adapted to utilize exhaust heat generated by the drive unit for producing hot water or by way of novel photovoltaic's to provide refrigeration.

2. The mobile operating plant according to claim 1, wherein the drive unit is operated with conventional fuels selected from the group consisting of diesel, and gasoline, and wherein the fuel tank is located outside the operating plant.

3. The mobile operating plant according to claim 1, wherein the control system further comprising GPS-GSM monitoring systems which have the object to control and maintain the plant and provide repairs, when required by remote control, and wherein the tariff regulator controls the electricity supply factor and which communicates with the plant as a whole.

4. The mobile operating plant according to claim 1, wherein the container is a plurality of containers forming a unit which due to the control system including an installed GPS-GSM communication system and the tariff regulator provides a ring circuit and which provides mutual communication.

5. The mobile operating plant according to claim 1, wherein the container further comprising exterior walls made of a material selected from the group consisting of metal, light metal, steel, steel sheeting, and aluminum panels, and that inside thereof insulation is provided.

6. The mobile operating plant according to claim 1, wherein the frame and exterior walls of the said container are made of plastics or synthetic resin, and wherein the buffer is selected from the group consisting of rubber buffers, leaf springs, and annular springs.

7. The mobile operating plant according to claim 1, wherein the electricity supply is provided by an underground cable or conventional overland line.

8. The mobile operating plant according to claim 1, wherein the fuel tank is made of a material selected from the group consisting of metal, chromium steel, stainless steel, glass, plastics, polyester, and ceramics.

9. The mobile operating plant according to claim 1, wherein the electricity generator is at least two electricity generators in order to increase the power supply capacity.

10. The mobile operating plant according to claim 1, wherein the drive unit is operated with conventional fuels selected from the group consisting of water methanol, and water ethanol, and wherein the fuel tank is located in the container.

11. The mobile operating plant according to claim 10, wherein the fuel supplied by the fuel tank is selected from the group consisting of water methanol, and water ethanol, and wherein the fuel tank is located in the container.

12. The mobile operating plant according to claim 10, wherein the fuel supplied by the fuel tank is selected from the group consisting of diesel, and gasoline, and wherein the fuel tank is outside the container.

13. The mobile operating plant according to claim 10, wherein the buffer is a rubber buffer.

14. The mobile operating plant according to claim 10, wherein the buffer is a spring selected from the group consisting of a leaf spring, and an annular spring.

15. The mobile operating plant according to claim 10, wherein the container further comprising an air filter.

16. The mobile operating plant according to claim 10, wherein the fuel tank further comprising a fuel pump for supplying fuel to the drive unit, the fuel pump being controlled by the control system.

17. The mobile operating plant according to claim 10, wherein the container further comprising an aerating and de-aerating installation.

18. A mobile power plant comprising:
a container having sheet panels filled with an insulating material, exterior walls, and a frame structure including a bottom plate featuring corners;
at least one buffer attachable to at least each of the corners of the bottom plate of the frame, each buffer being adapted to absorb vibrations;
at least one drive unit located in the container, the drive unit being a combustion engine;
at least one electricity generator driven by the drive unit by means of a drive shaft by way of a transmission;
at least one fuel tank for supplying fuel to the drive unit;
a control system having a GPS-GSM communication system, the control system being adapted to control the drive unit to run at an optimal rate of rotation and when required switches the drive unit on or off so that the generator delivers predetermined power requirements;
a tariff regulator for optimizing and controlling the electricity supply of said electricity generator;
an exhaust gas heat exchanger installed in an exhaust pipe of the drive unit is adapted to utilize exhaust heat generated by the drive unit to produce hot water or by way of novel photovoltaic's to provide refrigeration;
a door located in at least one of the exterior walls of the container; and
a hydraulic device for lifting at least one of the exterior walls of the container.

* * * * *